May 23, 1933. W. G. STONER 1,910,507
APPARATUS FOR LINING BRAKE SHOES
Original Filed Feb. 15, 1929   2 Sheets-Sheet 1
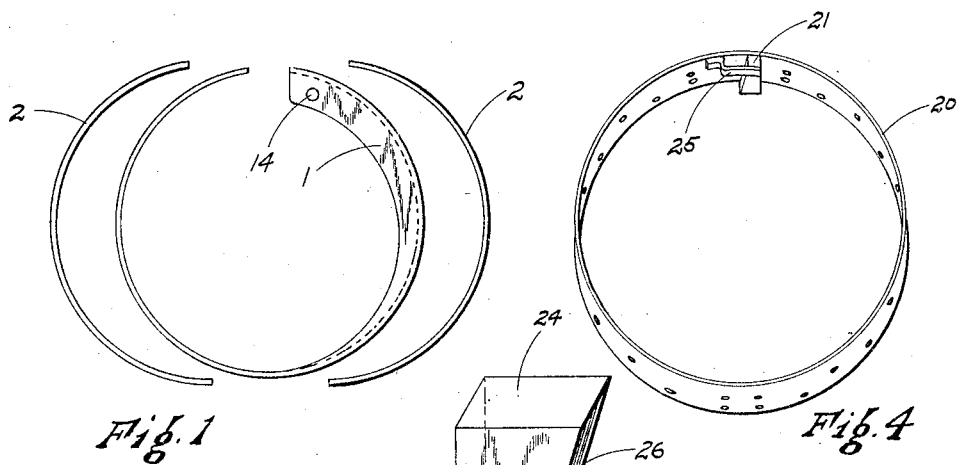
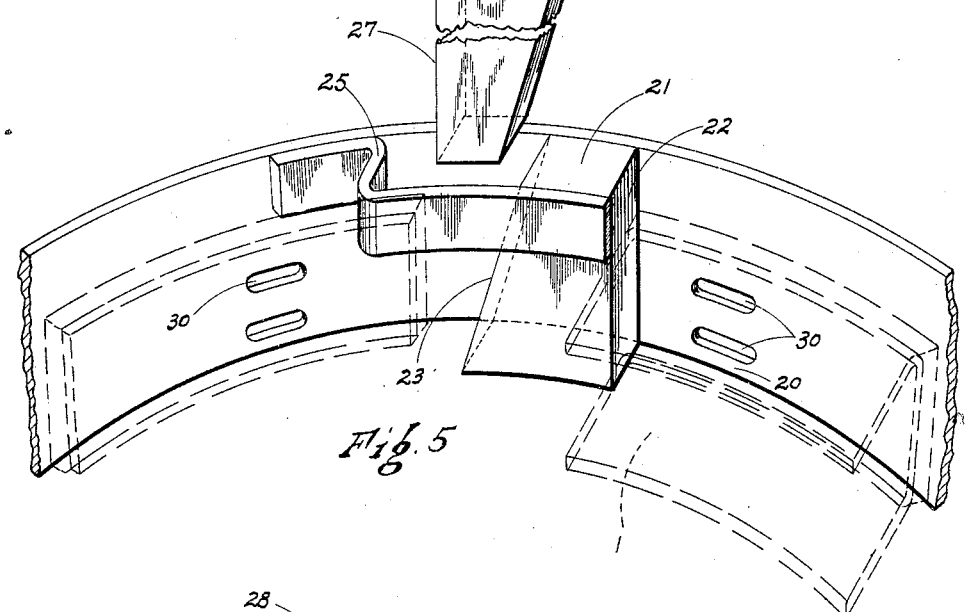
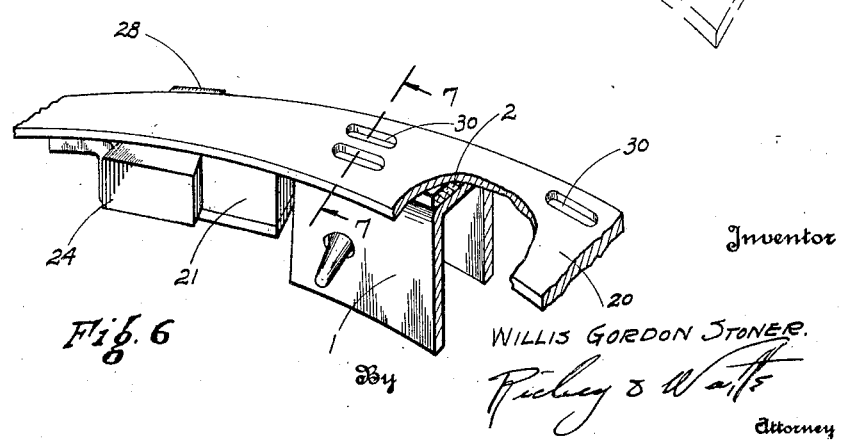
Inventor
WILLIS GORDON STONER.
By
Attorney May 23, 1933. W. G. STONER 1,910,507
APPARATUS FOR LINING BRAKE SHOES
Original Filed Feb. 15, 1929  2 Sheets-Sheet 2

Inventor
WILLIS GORDON STONER.
By Risley & Watts
Attorney

Patented May 23, 1933

1,910,507

UNITED STATES PATENT OFFICE

WILLIS GORDON STONER, OF DETROIT, MICHIGAN, ASSIGNOR TO THE MIDLAND STEEL PRODUCTS COMPANY, OF CLEVELAND, OHIO, A CORPORATION OF OHIO AS TRUSTEE FOR STEELDRAULIC BRAKE CORPORATION, OF DETROIT, MICHIGAN, A CORPORATION OF MICHIGAN

APPARATUS FOR LINING BRAKE SHOES

Original application filed February 15, 1929, Serial No. 340,249. Divided and this application filed April 2, 1930. Serial No. 440,986.

This application is a division of application Serial No. 340,249, filed February 15th, 1929 for the method of lining brake shoes and this application relates to apparatus for lining brake shoes according to the method described and claimed in the prior and copending application.

The object of this invention is to provide a simple and effective mechanism for forcing and holding brake lining in intimate contact with the shoes to which it is to be attached so that a snug fit will be obtained, and a saving of time in the operation will also be effected. It has always been a problem to provide efficient means to facilitate the attachment of linings to brake shoes, but the problem has become more acute in the case of applying molded lining which is relatively stiff at normal temperatures. If this intimate contact is not obtained at all points, it will be apparent that there will be parts of the brake lining which will be higher than other parts, and consequently these high parts will take excessive wear and strain when in use and will cause squeals and also put excessive strain on adjacent rivets.

These disadvantages are overcome by the use of the apparatus which constitutes the subject matter of the present invention. This apparatus includes a means for temporarily holding the lining onto the shoe for the drilling, reaming and riveting operations, after which such means is removed from the shoe and the latter is ready for other operations of assembly.

Other objects and advantages will appear from the following description of a preferred form of the invention. The essential characteristics are summarized in the claims.

Figure 2:
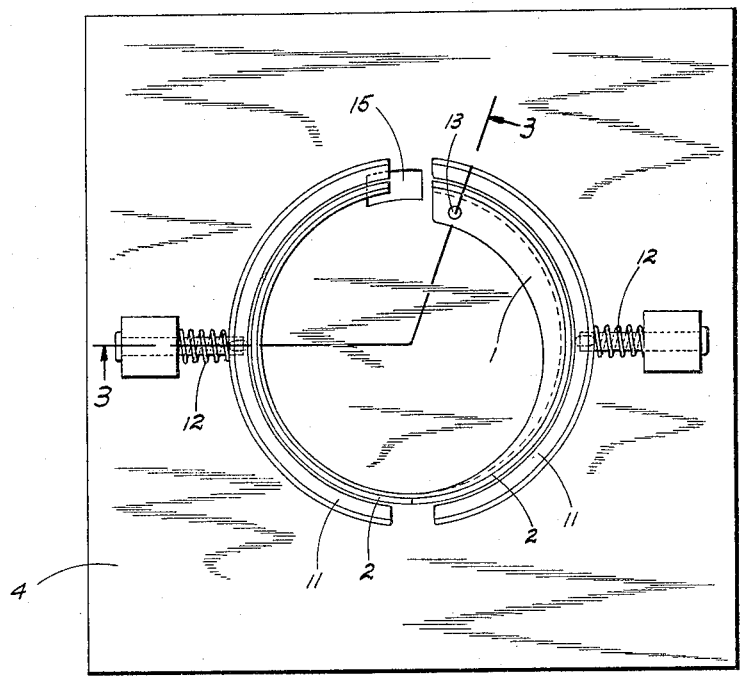
Figure 3:
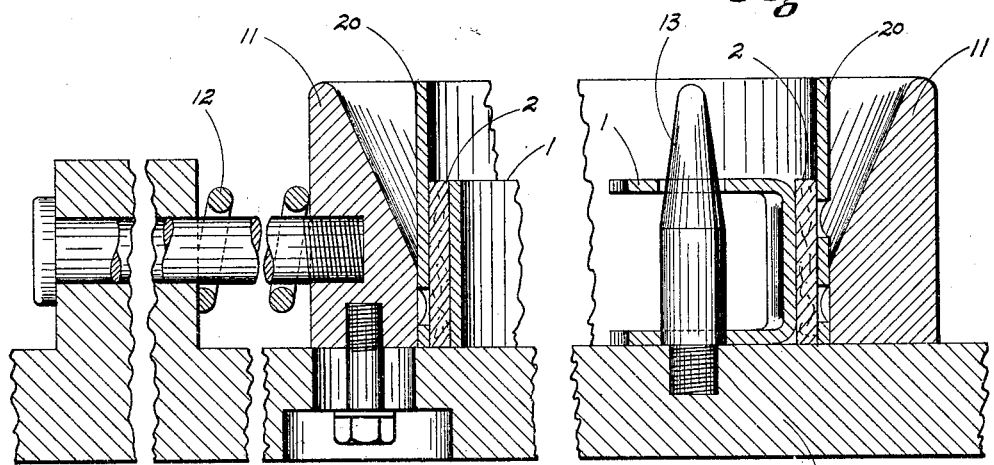
Figure 7:
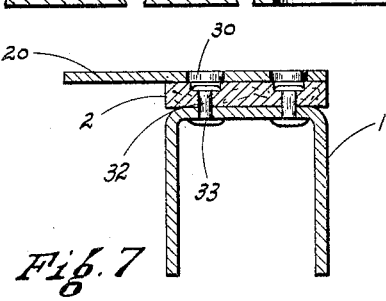

In the drawings, Fig. 1 is a brake shoe of the band type shown with separate pieces of brake lining to be secured thereto; Fig. 2 is a top plan view of a fixture used in fitting the lining to the shoe, the lining and shoe being shown in place therein; Fig. 3 is a broken section taken along the broken line 3—3 in Fig. 2, with the addition of the band not shown in Fig. 2; Fig. 4 illustrates a band within which the shoe and lining is expanded prior to the operation of securing the lining to the shoe; Fig. 5 is a perspective view of part of the band illustrated in Fig. 4, showing the means for expanding the shoe; Fig. 6 is a broken perspective cross-section through the band, the lining, the ends of the shoe, and the means for expanding the shoe; and Fig. 7 is a sectional view taken on the line 7—7 of Fig. 6.

Referring now more in detail to the drawings, the reference character 1 indicates the brake shoe to which the substantially semi-cylindrical pieces of brake lining 2 are to be secured. The fixture 4 has a bed plate 10 on which are slidably mounted arcuate guides 11 having inwardly inclined sides (see Fig. 3). These guides have a limited lateral travel and are urged inwardly by light coil springs 12. Secured to the bed plate is an upstanding pin 13 which is tapered at its upper end and serves as a guide for properly positioning the brake shoe. It will be noted in Fig. 3 that the brake shoe illustrated has axially aligned apertures 14, which when the shoe is placed in the fixture, receive the pin 13.

Before placing the lining pieces in the fixture 4 the brake shoe 1 is laid on the bed of the fixture between the guides 11 as shown in Fig. 2. Then the lining pieces are forced between the guides 11 and the outer periphery of the shoe (see also Fig. 3) so that the shoe and the lining lie in relatively loose contact and about the relative position in which they are to be ultimately secured together. While the shoe and the pieces of lining are in this position, an annular band 20 (see Fig. 4) of relatively light and flexible and substantially inextensible stock having an internal diameter slightly greater than the normal exterior diameter of the shoe and lining, is dropped or forced downwardly between the guides 11 and the pieces of lining 2, as shown in Fig. 4. Thereafter by means of a simple wedging device, part of which is incorporated with the band 20, the shoe is expanded within the band with considerable pressure so that the pieces of lining 2 are squeezed between the band and the outer periphery of the shoe and made to fit in intimate contact with the outer periphery of the shoe at all points, due to the flexibility of the annular band.

The wedging device consists of a block 21 (see Figs. 4, 5 and 6) which is secured to the inner face of the band and which present a radial surface 22 to one end of the shoe and which presents an inclined surface 23 against which an inclined face of a separate wedge member 24 is adapted to cooperate to spread the ends of and thereby expand the brake shoe 1. A bracket 25 is secured to the block 21 and serves as a guide for the wedge 24 on its entry between the block 21 and the end of the brake shoe.

The wedge 24 has an inclined face 26 for coaction with the inclined face of the block 21 and a radial face 27 on the side opposite to the inclined face. When the wedge 24 is put into place it will be seen from Fig. 6 that one end of the shoe abuts against the radial face 22 of block 21 and the other end abuts against the radial face 27 of the wedge 24. Thus as the wedge is driven downwardly, the faces 22 and 27 of the block and wedge respectively are forced circumferentially apart thus forcing the ends of the shoe apart and expanding the shoe to fit tightly within the band 20 with the pieces of lining interposed therebetween. A hole 15 is provided in the bed plate 10, so that the lower end of the wedge may extend below the surface of the plate as the ends of the shoe are spread apart. Thus the end of the wedge protrudes beyond the edge of the band, as shown at 28 in Fig. 6.

The lining may preferably be heated to a state of relative pliability and will be squeezed between the band and the shoe and held in intimate contact with the latter on the driving home of the wedge 24. The band, lining and shoe can then be removed as a unit from the fixture 4.

The band is provided with apertures 30 for the reception therein of a drill, reamer and countersink and also for allowing the passage therethrough of a rivet for riveting the lining to the brake shoe. The brake shoe is provided with holes 31 for the reception therein of the rivets and these holes are preferably drilled before the lining is placed on the brake shoe.

The lining which is still held between the band and shoe is then drilled, reamed and countersunk to provide the countersunk hole 32. The lining is then riveted to the shoe by means of rivets 33, while still being held between the band 20 and shoe 1.

After the riveting operation the wedge 24 is driven from its position between one end of the shoe and the block 21 by striking the small exposed end 28. In practice this may be accomplished by simply slamming the assembled parts on to a flat table so that the end 28 of the wedge strikes the table and is dislodged from its effective position. Thereafter the band may be lifted from the shoe and the band and wedge are returned to the fixture 4 where they are again used in the same manner. This apparatus is especially useful in securing molded lining, which is relatively stiff at normal temperatures, to brake shoes, and is adapted for use with any kind of brake lining.

It will thus be seen that a very simple and effective apparatus has been disclosed and not only does the use of the apparatus attain better results but it also accomplishes these results in less time than has heretofore been required.

Having thus described the invention, what is claimed and desired to be secured by Letters Patent is:

1. Apparatus for lining brake shoes comprising an annular band within which the shoe and lining are disposed, and wedging means engaging the ends of the shoe wherewith the shoe is expanded and the lining is squeezed between the shoe and said band.

2. Apparatus for lining split ring brake shoes comprising an annular band of greater diameter than the shoe and a wedging device comprising a part carried by the band for expanding the shoe into the band and squeezing the lining between the shoe and the band.

3. Apparatus for lining brake shoes including a fixture having a flat bed-plate and slidable guides within which a brake shoe and appropriate lining may be loosely positioned, and a circular band insertable between the lining and said guides into which the shoe is expanded to squeeze the lining between the shoe and the band.

4. Apparatus for lining split ring brake shoes comprising a band within which the shoe with its lining may be loosely inserted, in combination with a block secured to the inner side of said band having a radial face engageable by one end of the shoe and an inclined face opposite the radial face, and a wedge member engageable with the other end of the shoe and with the inclined face of said member for expanding the shoe and squeezing the lining between the band and the shoe.

5. Apparatus for lining brake shoes comprising a flexible band within which the shoe with its lining may be loosely inserted, in combination with a block secured to the inner side of said band having a radial face engageable by one end of the shoe and an inclined face opposite the radial face, and a wedge member engageable with the other end of the shoe and with the inclined face of said member for expanding the shoe and squeezing the lining between the band and the shoe while the band gives radially to insure substantially equal pressures between the shoe and the lining.

6. Apparatus for lining split ring brake shoes comprising an annular band having an interiorly disposed wedging device for expanding the ends of the shoe and squeezing the lining between the band and the shoe, said band having elongated openings opposite the lining through which rivets may be inserted for securing the lining to the shoe while the shoe is expanded within the band.

7. Apparatus for lining split ring brake shoes comprising an annular band and wedging means disposed within said band for expanding the brake shoe within said band, said wedging means comprising a block secured to the inner side of said band having an inclined face and a wedge having an inclined face for cooperation with the inclined face of said block.

8. Apparatus for lining split ring brake shoes comprising an annular band and wedging means disposed within said band for expanding the brake shoe within said band, said wedging means comprising a block secured to the inner side of said band having an inclined face, a wedge having an inclined face for cooperation with the inclined face of said block, the faces of said block and said wedge opposite said inclined faces being flat for engaging and spreading the ends of said brake shoe.

9. Apparatus for lining split ring brake shoes comprising an annular band and wedging means disposed within said band for expanding the brake shoe within said band, said wedging means comprising a block secured to the inner side of said band having an inclined face, a wedge having an inclined face for cooperation with the inclined face of said block and a keeper on the inside of said band for said wedge.

10. Apparatus for lining a brake shoe comprising an annular band and wedging means for expanding the brake shoe within the band, said wedging means being associated with the annular band and extending radially inwardly therefrom to engage the ends of the brake shoe.

11. Apparatus for lining brake shoe structures including a yieldable form within which the brake shoe structure and lining may be positioned and removed, and a circular band insertable between the lining and form into which the shoe structure is expanded to squeeze the lining between the shoe structure and band.

In testimony whereof I hereunto affix my signature this 28th day of March, 1930.

WILLIS GORDON STONER.